United States Patent
Liu et al.

(10) Patent No.: US 11,909,188 B2
(45) Date of Patent: Feb. 20, 2024

(54) CABLE SEALING DEVICE AND CABLE SEALING SYSTEM

(71) Applicant: CommScope Technologies LLC, Hickory, NC (US)

(72) Inventors: Maosheng Liu, Jiangsu (CN); PuLiang Tang, Jiangsu (CN); Zhaohui Liu, Jiangsu (CN); Ruixin Su, Jiangsu (CN)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 400 days.

(21) Appl. No.: 17/224,703

(22) Filed: Apr. 7, 2021

(65) Prior Publication Data

US 2021/0328420 A1    Oct. 21, 2021

(30) Foreign Application Priority Data

Apr. 15, 2020 (CN) .......................... 202010292982.1

(51) Int. Cl.
*H02G 15/013* (2006.01)
*H01R 13/52* (2006.01)

(52) U.S. Cl.
CPC ....... *H02G 15/013* (2013.01); *H01R 13/5205* (2013.01)

(58) Field of Classification Search
CPC ... H01R 13/5205; H02G 3/083; H02G 15/013
See application file for complete search history.

(56) References Cited

U.S. PATENT DOCUMENTS

| 2,568,277 | A | * | 9/1951 | Eltgroth | G01N 29/02 73/24.01 |
| 3,142,983 | A | * | 8/1964 | Dudley | G01N 25/00 374/40 |
| 3,538,750 | A | * | 11/1970 | Lynnworth | G01N 29/228 374/45 |
| 3,676,777 | A | * | 7/1972 | Charters | G01R 31/31905 324/762.02 |
| 3,987,133 | A | * | 10/1976 | Andra | F24F 6/025 261/130 |
| 4,584,429 | A | * | 4/1986 | Raketti | H01B 17/28 174/31 R |

(Continued)

*Primary Examiner* — William H. Mayo, III
*Assistant Examiner* — Rhadames Alonzo Miller
(74) *Attorney, Agent, or Firm* — Myers Bigel, P.A.

(57) ABSTRACT

The invention relates to a cable sealing device comprising: a first plate having a group of first holes and configured to be mounted to a first side of a housing wall; a second plate having a group of second holes and configured to be mounted to a second side of a housing wall; and a soft elastic sealing element configured to be mounted between one of the first and second plates and the housing wall. The group of first holes and the group of second holes and the sealing element are configured to receive a group of cables, and the first and the second plate can be biased toward each other, so that the sealing element can be pressed and elastically deformed. The sealing element can seal and fix the group of cables in the housing wall in a pressed and elastically deformed status. The invention also relates to a cable sealing system comprising a housing wall and the cable sealing device. The cable sealing device is simple in structure and easy to assemble, and can ensure good sealing and fixing of the cables.

12 Claims, 2 Drawing Sheets

(56) References Cited

U.S. PATENT DOCUMENTS

| | | | | |
|---|---|---|---|---|
| 4,826,276 | A * | 5/1989 | Abbott | G02B 6/4248 385/94 |
| 4,990,312 | A * | 2/1991 | Rucker | G01N 25/50 422/78 |
| 5,220,824 | A * | 6/1993 | Shelleman | G01N 3/12 374/57 |
| 5,318,361 | A * | 6/1994 | Chase | G01N 17/002 374/57 |
| 5,466,943 | A * | 11/1995 | Green | H01L 31/024 250/493.1 |
| 5,775,702 | A * | 7/1998 | Laeremans | G02B 6/4471 174/152 G |
| 5,806,979 | A * | 9/1998 | Gschneidner, Jr. | G01N 25/005 374/33 |
| 5,851,143 | A * | 12/1998 | Hamid | G01R 31/2849 |
| 5,929,340 | A * | 7/1999 | Cochran | G01R 31/2817 324/700 |
| 6,005,404 | A * | 12/1999 | Cochran | G01R 31/2817 324/754.08 |
| 6,039,324 | A * | 3/2000 | Santa, Jr. | H02G 15/013 277/606 |
| 6,118,076 | A * | 9/2000 | Damm | H02G 15/113 174/92 |
| 7,273,985 | B2 * | 9/2007 | Holmberg | H02G 15/04 174/68.3 |
| 8,479,597 | B2 * | 7/2013 | Pickel | G01M 7/027 73/571 |
| 9,097,609 | B1 * | 8/2015 | Kelley | G01M 3/32 |
| 9,678,025 | B1 * | 6/2017 | Fesmire | G01N 25/72 |
| 10,031,097 | B1 * | 7/2018 | Han | G01N 27/121 |
| 2008/0210455 | A1 * | 9/2008 | Pollack | H01R 13/405 174/151 |
| 2008/0298765 | A1 * | 12/2008 | Cox | G02B 6/4444 385/139 |
| 2009/0192578 | A1 * | 7/2009 | Biggs | A61N 1/3752 607/116 |
| 2013/0201627 | A1 * | 8/2013 | Limbacher | H05K 7/20418 361/688 |
| 2015/0207054 | A1 * | 7/2015 | Kanno | H10N 10/13 324/72 |
| 2015/0305187 | A1 * | 10/2015 | Chalmers | H02G 15/34 174/18 |
| 2016/0216469 | A1 * | 7/2016 | Anderson | B65D 43/0214 |
| 2016/0268791 | A1 * | 9/2016 | Gerl | C03C 8/24 |
| 2017/0141443 | A1 * | 5/2017 | Herklotz | H01M 10/482 |
| 2018/0278037 | A1 * | 9/2018 | Coenegracht | H02G 3/088 |
| 2020/0194927 | A1 * | 6/2020 | Ledieu | H02G 15/013 |
| 2020/0245165 | A1 * | 7/2020 | Nilsson | H04W 24/08 |
| 2020/0251694 | A1 * | 8/2020 | Wakimoto | H01M 50/528 |
| 2020/0251711 | A1 * | 8/2020 | Wakimoto | H01M 50/15 |
| 2020/0350703 | A1 * | 11/2020 | Niu | H01R 13/506 |
| 2020/0395715 | A1 * | 12/2020 | Martinez | H01B 7/14 |
| 2021/0011241 | A1 * | 1/2021 | Giraud | G02B 6/44775 |
| 2021/0104796 | A1 * | 4/2021 | Wakimoto | H01M 50/209 |
| 2022/0025972 | A1 * | 1/2022 | Cheng | F16J 15/061 |
| 2022/0349783 | A1 * | 11/2022 | Bender | G01N 1/14 |

* cited by examiner

CABLE SEALING DEVICE AND CABLE SEALING SYSTEM

CROSS-REFERENCE TO RELATED APPLICATION

The present application claims priority from and the benefit of Chinese Patent Application No. 202010292982.1, filed Apr. 15, 2020, the disclosure of which is hereby incorporated herein in its entirety.

FIELD OF THE INVENTION

The present invention relates to a cable sealing device for sealing a group of cables passing through a housing wall and a cable sealing system including the same.

BACKGROUND OF THE INVENTION

In electrical or electronic devices, such as in communication devices, a plurality of cables are introduced therein, which may be, for example, cables or optical cables. Sealing and fixing cables in a housing wall of the devices may be required, for example, for preventing moisture from entering the devices through a cable introduction area of the housing wall of the devices.

The disclosure CA2841784C discloses a cable sealing device in which cables are sealed and fixed to each other by means of a sealing element.

SUMMARY OF THE INVENTION

It is an object of the present invention to provide a cable sealing device and a cable sealing system in which sealing and fixing cables in a housing wall can be reliably achieved in a simple manner.

According to a first aspect of the present invention, a cable sealing device is proposed, comprising:
- a first plate having a group of first holes and configured to be mounted to a first side of a housing wall;
- a second plate having a group of second holes and configured to be mounted to a second side of the housing wall opposite the first side; and
- a soft elastic sealing element configured to be mounted between one of the first and the second plate and the housing wall;
- wherein the group of first holes and the group of second holes and the sealing element are configured to receive a group of cables, the first and the second plate can be biased toward each other so that the sealing element can be pressed and elastically deformed, and wherein the sealing element can seal and fix the group of cables in the housing wall in a pressed and elastically deformed status.

The cable sealing device may be simple in structure and easy to assemble, and can provide good sealing and fixing of cables in the housing wall.

In some embodiments, the cables may be electrical cables, optical cables, or hybrid electrical/optical cables.

In some embodiments, the sealing element may have a group of third holes configured to receive the group of cables.

In some embodiments, the sealing element may include an annular part and an inner part that can be embedded into a central cavity of the annular part. The two-piece sealing element may facilitate the installation of the sealing element.

In some embodiments, at least one, e.g., a majority, of the group of third holes may be divided by the annular part and the inner part.

In some embodiments, the sealing element may include a group of soft elastic sealing rings, each of which is configured for one of the group of cables.

In some embodiments, the second plate may be configured to be mounted to the second side of the housing wall as an outer surface.

In some embodiments, the sealing element may be configured to be mounted between the second plate and the housing wall or between the first plate and the housing wall.

In some embodiments, the cable sealing device may include at least one bolt connection configured to bias the first and the second plate toward each other. For example, the cable sealing device may include a pair of bolt connections parallel to each other.

In some embodiments, the first and the second plate may have a respective receiving hole for receiving a bolt of the bolt connection.

In some embodiments, the sealing element may have a receiving hole for receiving the bolt of the bolt connection.

In some embodiments, the bolt of the bolt connection may be integrally formed with the first or the second plate.

In some embodiments, the bolt of the bolt connection may be provided with a sealing ring configured to be mounted between one of the first and the second plate and the housing wall and to seal the bolt in a pressed and elastically deformed status.

In some embodiments, the sealing ring for the bolt may be configured to be mounted between the first plate and the housing wall.

In some embodiments, the sealing ring for the bolt may be configured to be mounted between the second plate and the housing wall.

According to a second aspect of the present invention, a cable sealing system is proposed, which includes a housing wall having a group of fourth holes configured to receive the group of cables and a cable sealing device according to any one of the embodiments of the present invention.

In some embodiments, the housing wall may have a roof structure extending from the second side thereof and partially surrounding a cable introduction area having the group of fourth holes.

In some embodiments, the housing wall may have a rib arrangement on its second side that surrounds and separates the group of fourth holes.

In some embodiments, the housing wall may have a cylindrical hole for receiving the bolt of the bolt connection, the cylindrical hole protruding from the second side of the housing wall, and a nut of the bolt connection can abut against the cylindrical hole.

BRIEF DESCRIPTION OF DRAWINGS

The present invention will now be described in more detail by means of specific embodiments with reference to the accompanying drawings. The schematic drawings are briefly introduced as follows.

DETAILED DESCRIPTION OF EMBODIMENTS

The present invention will be described below with reference to the accompanying drawings. The drawings illustrate embodiments of the present invention. However, it should be understood that the present invention may be presented in many different ways and is not limited to the embodiments described below. In fact, the embodiments described below are intended to make the disclosure of the present invention more complete and to fully explain the scope of protection of the present invention to those skilled in the Art. It should also be understood that the embodiments disclosed herein can be combined in various ways to provide more additional embodiments.

It should be understood that the terminology used in the specification is only for describing specific embodiments and is not intended to limit the present invention. All terms used in the specification have the meanings commonly understood by those skilled in the art unless otherwise defined. For the sake of simplicity and clarity, well-known functions or structures may not be described in detail.

Figure 1:
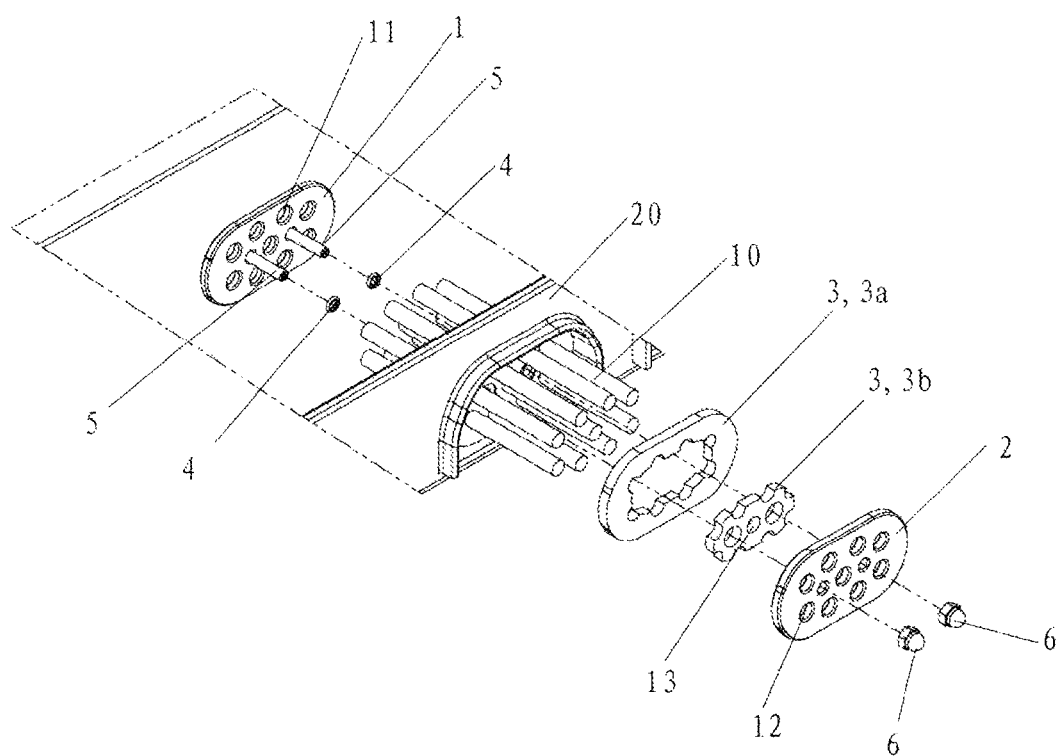
FIG. 1 is a perspective exploded view of a cable sealing device and a cable sealing system according to an embodiment of the present invention.

FIG. 1 is a perspective exploded view of a cable sealing device and a cable sealing system according to an embodiment of the present invention, the cable sealing system including a housing wall 20 and the cable sealing device, wherein the housing wall is partially illustrated. The housing wall may be a part of a housing of an electrical, optical or electronic device. The device may be, for example, a communication device. A group of cables 10 may be introduced into or extended out from the housing of the device through the housing wall 20.

The cable sealing device includes a first plate 1 having a group of first holes 11 and configured to be mounted to a first side of the housing wall 20. The group of cables 10 may pass through the group of first holes 11. The cable sealing device includes a second plate 2 having a group of second holes 12 and configured to be mounted to a second side of the housing wall 20 opposite the first side. The group of cables 10 may pass through the group of second holes 12.

The cable sealing device includes a soft elastic sealing element 3 configured to be mounted between one of the first and second plates and the housing wall. In the embodiment shown in FIG. 1, the first side is an inner surface of the housing wall and the second side is an outer surface of the housing wall, and the sealing element is disposed between the housing wall and the second plate. Additionally, or alternatively, it would be appreciated that another sealing element may be disposed between the housing wall and the first plate. The first plate 1 and the second plate 2 can be biased toward each other so that the sealing element 3 can be pressed and elastically deformed, wherein the sealing element 3 can seal and fix the group of cables 10 in the housing wall in a pressed and elastically deformed status.

As shown in FIG. 1, the sealing element 3 may be in two pieces, including an outer part 3a and an inner part 3b, which can be embedded into a central cavity of the outer part. The sealing element may have a group of third holes 13 configured to receive the group of cables 10. At least one of the group of third holes may be divided by the outer part and the inner part. In the embodiment shown in FIG. 1, the sealing element 3 has nine third holes, eight of which are divided by the outer part and the inner part, and the remaining one third hole is provided in the inner part 3b.

The cable sealing device may include at least one bolt connection configured to bias the first and the second plate toward each other. As shown in FIG. 1, the cable sealing device may include a pair of bolt connections parallel to each other. The first plate 1 and the second plate 2 and the sealing element 3 may have respective receiving holes for receiving a bolt 5 of the bolt connection. Alternatively, the bolt of the bolt connection may be integrally formed with the first or the second plate. The bolt 5 of the bolt connection may also be provided with a sealing ring 4 configured to be mounted between one of the first and the second plate and the housing wall and to seal the bolt in a pressed and elastically deformed status.

Figure 2:
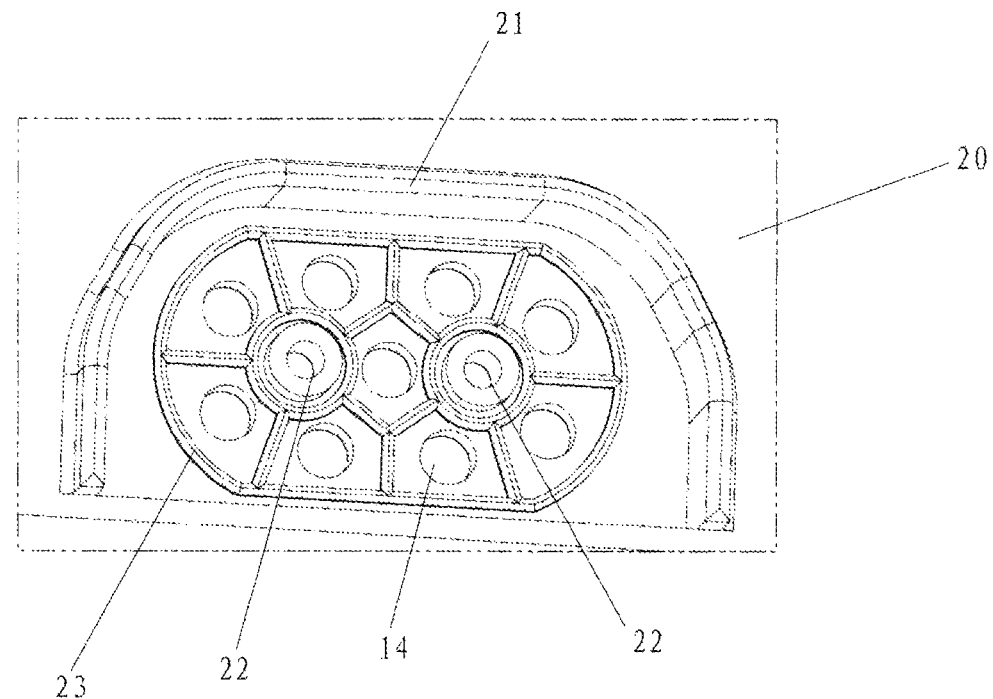
FIG. 2 is a partial view of the housing wall of the cable sealing system of FIG. 1.

As shown in FIG. 2, the housing wall 20 may have a group of fourth holes 14 configured to receive the group of cables 10. The housing wall 20 may have a roof structure 21 extending from the second side thereof and partially surrounding a cable introduction region having the group of fourth holes. By means of the roof structure, falling rain water or the like can be prevented from entering the cable introduction area of the housing wall substantially. The housing wall 20 may have a rib arrangement 23 on its second side that surrounds and separates the group of fourth holes 14. The rib arrangement 23 may facilitate sealing and fixing of the sealing element when the sealing element is pressed. The housing wall 20 may have a cylindrical hole 22 for receiving the bolt 5 of the bolt connection, the cylindrical hole 22 protruding from the second side of the housing wall 20, against which a nut 6 of the bolt connection can abut. An amount of compression of the sealing element can be clearly defined by the nut 6 abutting against the cylindrical hole 22, thus ensuring a reliable sealing function and a fixing function of the sealing element to the cables.

Figure 3:
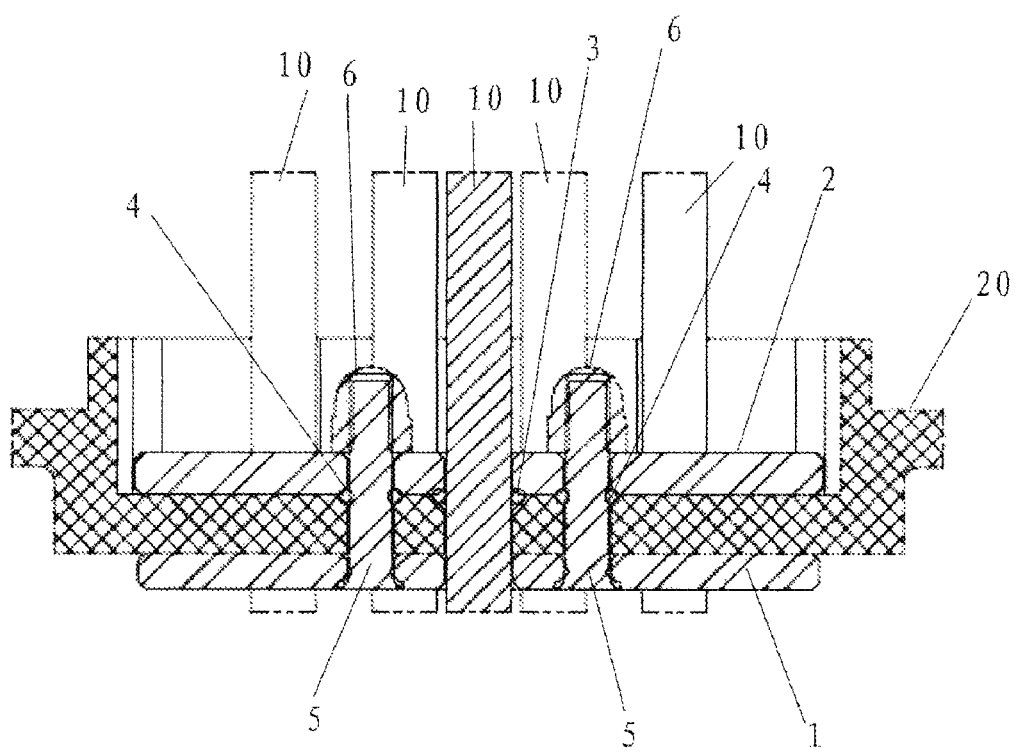
FIG. 3 is a partial sectional view of a cable sealing device and a cable sealing system according to another embodiment of the present invention.

FIG. 3 is a partial sectional view of a cable sealing device and a cable sealing system according to another embodiment of the present invention. The embodiment according to FIG. 3 differs from the embodiment according to FIG. 1 mainly in that, instead of the two-piece sealing element 3, a group of sealing elements 3 are provided, each of which is configured as a soft elastic sealing ring that is configured for one of the groups of cables. The sealing ring 4 for the bolt connection and the sealing elements 3 may be disposed on the same side of the housing wall 20. The housing wall 20 does not have a cylindrical hole for the bolt connection. In other aspects, references may be made to the description of FIGS. 1 and 2.

In the illustrated embodiments, the number of cables and the number of holes are exemplary. For example, it is also possible that 2, 3 or more cables may be introduced into the device.

It will be understood that, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc.).

Terms such as "top," "bottom," "upper," "lower," "above," "below" and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments disclosed herein can be combined in any way. Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

What is claimed is:

1. A cable sealing device, comprising:
   a first plate having a group of first holes and configured to be mounted to a first side of a housing wall;
   a second plate having a group of second holes and configured to be mounted to a second side of the housing wall opposite the first side; and
   a soft elastic sealing element configured to be mounted between one of the first and the second plate and the housing wall;
   wherein the group of first holes and the group of second holes and the sealing element are configured to receive a group of cables, and the first and the second plate can be biased toward each other, so that the sealing element can be pressed and elastically deformed, wherein the sealing element can seal and fix the group of cables in the housing wall in a pressed and elastically deformed status.

2. The cable sealing device according to claim 1, characterized in that the sealing element has a group of third holes configured to receive the group of cables.

3. Cable sealing device according to claim 2, characterized in that the sealing element comprises an outer part and an internal part which can be embedded into the central cavity of the annular part.

4. The cable sealing device according to claim 3, characterized in that a majority of the group of third holes are divided by the outer part and the inner part.

5. The cable sealing device according to claim 1, characterized in that the second plate is configured to be mounted to the second side of the housing wall as an outer surface, and the sealing element is configured to be mounted between the second plate and the housing wall.

6. The cable sealing device according to claim 1, characterized in that the cable sealing device comprises at least one bolt connection configured to tension the first and the second plate each other.

7. The cable sealing device according to claim 6, characterized in that the first and the second plate have respective receiving holes for receiving a bolt (5) of the bolt connection.

8. The cable sealing device according to claim 6, characterized in that the bolt of the bolt connection is provided with a sealing ring, and the sealing ring for the bolt is configured to be mounted between one of the first and the second plate and the housing wall, and to seal the bolt in a pressed and elastically deformed status.

9. A cable sealing system comprising a housing wall and a cable sealing device according to claim 1, wherein the housing wall has a group of fourth holes configured to receive a group of cables.

10. The cable sealing system according to claim 9, characterized in that the housing wall has a roof structure extending from the second side thereof and partially surrounding a cable introduction area having the group of fourth holes.

11. The cable sealing system according to claim 9, characterized in that the housing wall has a rib arrangement surrounding and separating the group of fourth holes on its second side.

12. The cable sealing system according to claim 9, characterized in that the cable sealing device comprises at least one bolt connection configured to bias the first and the second plate toward each other, wherein the housing wall has a cylindrical hole for receiving a bolt of the bolt connection, wherein the cylindrical hole protrudes from the second side of the housing wall, and wherein a nut of the bolt connection can abut against the cylindrical hole.

* * * * *